United States Patent [19]
Lewin

[11] Patent Number: 6,084,672
[45] Date of Patent: Jul. 4, 2000

[54] DEVICE FOR OPTICALLY MEASURING AN OBJECT USING A LASER INTERFEROMETER

[75] Inventor: Andrew Lewin, Waldbronn, Germany

[73] Assignee: Polytec GmbH, Waldronn, Germany

[21] Appl. No.: 09/153,604

[22] Filed: Sep. 15, 1998

[30] Foreign Application Priority Data

Sep. 16, 1997 [DE] Germany ............ 197 40 678

[51] Int. Cl.⁷ .................................................. G01B 9/02
[52] U.S. Cl. ...................................... 356/357; 359/370
[58] Field of Search ................................ 356/357, 345, 356/355, 359; 359/370, 371

[56] References Cited

U.S. PATENT DOCUMENTS 5,880,465  3/1999  Boettner et al. .................. 250/234

FOREIGN PATENT DOCUMENTS

| | | |
|---|---|---|
| 2 422 866 | 11/1974 | Germany . |
| 31 13 090 A1 | 10/1982 | Germany . |
| 21 02 027 C2 | 12/1982 | Germany . |
| 41 06 572 C2 | 6/1993 | Germany . |
| 42 13 638 | 10/1993 | Germany . |
| 196 13 677 A1 | 10/1996 | Germany . |
| 195 28 513 A1 | 2/1997 | Germany . |
| 1619023 | 1/1992 | U.S.S.R. . |

OTHER PUBLICATIONS

Sietse M. van Netten, "Laser interferometer microscope for the measurement of nanometer vibrational displacements of a light–scaterring microscopic object", J. Acoustical Society of America, 83 (4): 1667–1674 (Apr. 1988).

Hans–Georg Kapitza, "Konfokale Laserscan–Mikroskopie zur optischen Vermessung der Mikrotopographie von Oberflächen und Schichten", Technisches Messen, 63: 136–141 (Apr. 1996).

B. Stoffregen, "Flächenabtastendes Laser–Doppler–Schwingungsanalysesystem", Technisches Mesen 51(11): 394–397 (1984).

*Primary Examiner*—Samuel A. Turner
*Attorney, Agent, or Firm*—Akin, Gump, Strauss, Hauer & Feld, L.L.P.

[57] ABSTRACT

A device is provided for optical measurement of an object, in particular for path and/or vibration measurements, using a laser interferometer, wherein a measuring beam is input into the beam path of a microscope. The device has a mechanism for shifting the measuring beam in an approximately parallel manner. The input of the measuring beam is accomplished via a camera connection of the microscope. The shifting device causes a shift of the impact point of the measuring beam on the measurement object, and the measuring beam reflected back or scattered from the measurement object is decoupled via the camera connection from the beam path of the microscope.

12 Claims, 2 Drawing Sheets

DEVICE FOR OPTICALLY MEASURING AN OBJECT USING A LASER INTERFEROMETER

BACKGROUND OF THE INVENTION

The invention involves a device for the optical measurement of an object, in particular for path and/or vibration measurement, using a laser interferometer whose measuring beam is input into the beam path of a microscope, wherein the device has an assembly for approximately parallel shifting of the measuring beam.

Laser interferometers represent ideal measurement structures for high resolution path and/or vibration measurements. The measurements thus take place in a purely optical, i.e., contact-free, manner. They are therefore also particularly suitable for micromechanical, microelectrical or microbiological objects, in which the attachment, for example, of traditional accelerating sensors for other vibration measuring processes, is inherently not possible because of the small mass of the object.

In the measurement of small objects of this type, it is desirable to observe the area to be measured in a microscope and to be able to position the measuring point using the microscope. For this, an assembly is known in which a measuring beam is input over the path of illumination into the beam path of the microscope. Because of the geometrical conditions to be maintained during the input over the illumination path, the interferometer and microscope can only be constructed as a combined unit. The use of this device is thus impeded by the high construction costs, because in addition to the interferometer, a special microscope must also still be manufactured, which, particularly in view of the construction of its illumination path, must be adapted to the interferometer used.

The generic concept of the device described at the outset starts from the publication S. M. van Netten "Laser interferometer microscope for the measurement of nanometer vibrational displacements of a light-scattering microscope object," *J. Acoust. Soc. Am.,* 83 (4):1667–1074 (April 1988). In this measurement device, two laser beams are operated which interfere on the measurement object. Movements of the measurement object can only be measured perpendicular to the direction of observation (in-plane).

SUMMARY OF THE INVENTION

Taking this as a starting point, an object of the present invention is to provide a device for contact-free path and/or vibration measurement, which allows an easier and more exact measurement of individual object points and the analysis of larger object areas. Furthermore, a device for contact-free path and/or vibration measurement should be made available, which can be used on conventional microscopes without expensive modification work.

These objects are achieved according to the invention in that the input of the measurement beam is accomplished via a camera connection (C-mount) of the microscope, that the aforementioned shifting device effects a shift of the impact point of the measuring beam on the object to be measured, and that the measuring beam reflected back or scattered from the measurement object is automatically decoupled via the camera connection from the beam path of the microscope and guided back into the measuring system.

The invention thus starts from the following discoveries: in traditional interferometers, not coupled to a microscope, an angular displacement of the measuring beam is customary, in order to be able to capture several adjacent measuring points. This would lead to considerable difficulties in a microscope. In order to run the measuring beam always through the lens, the point around which the measuring beam had to be pivoted would then have had to lie inside the microscope. This point had to be hit under all circumstances with absolute precision. This would require an extremely precise and thus very expensive pivoting mechanism, possibly running on circular tracks outside of the microscope, if it could be achieved at all. An installation of such a mechanism into different microscopes would not be possible, since the pivot point must have a different position depending on the geometry of the microscope.

By the parallel shifting of the measuring beam according to the invention, it is possible to record not only one, but several points of the measurement object, without moving the measurement object, such that the equipment expense for shifting the measuring beam is comparatively small.

By the input of the measuring beam via the camera connection (C-mount) of the microscope, it runs practically through the entire microscope lens system with the exception of the eyepiece, whereby the measurement can be performed in a considerably more precise manner than in the known case.

Moreover, the advantage thereby results that the measuring device can be applied universally to different microscopes, since the known camera connections for photographic or video cameras are present as standard equipment on most commercially available microscopes, as a rule even with standard connection sizes. Thus, one finds the same optical and mechanical connection conditions everywhere. This applies not only for the size of the connection, but also for the fact that the microscope lens system focuses the light coming from the measurement object in a defined plane shortly behind the end of the camera connection, namely at the location where, for an optionally mounted video camera, the CCD-chip is located.

Preferably, the light scattered by the object is guided back over the same light path as the light sent into the interferometer and interferes there with the reference beam. In this process, only those movement portions of the measurement object are recorded which run in the direction of the measuring beam (out of plane). Frequent advantages result hereby, in view of the positioning of the measuring device relative to the measurement object.

The shifting device allows, in an advantageous way, a point- and/or line-wise optical scanning of the measurement object in any direction, expediently in the x and y direction. For this purpose, the measuring beam is shifted in parallel either by hand or its shifting is undertaken automatically, for example, under control of a computer.

For the parallel shifting of the measuring beam, the shifting device has a lens which can be moved laterally approximately perpendicular to the beam path. Since this lens has a very small mass, it can be moved very quickly and precisely, which makes possible an effective and exact scanning.

Instead of by a lens, the parallel shifting of the beam can, however, also take place via several corresponding, aimable, and optionally distanceable mirrors.

In order to move the shifting device, micrometer screws, piezo elements or the like are advantageously used, because of the small displacement paths required. Piezo elements can also be connected very well to an automatic control, in order to simplify the scanning operation for the user.

In order to input the measuring beam, this is expediently focused on a focal plane (first image plane) of the microscope. For this purpose, the device can have a focusing lens. From this focal plane, the focused measuring beam is then projected through the lens system of the microscope onto the measurement object.

The beam supply to the shifting device can be easily and advantageously realized by an optical wave guide, for example in the form of a glass fiber optic. From the microscope end of the optical wave guide, the mentioned focusing lens is arranged at a distance corresponding to its focal length. By the arrangement described, the point on which the measuring beam is focused in the focal plane can be moved by shifting the shiftable lens laterally in two axes.

It is especially advantageous if the object can be measured and observed simultaneously. To do this, the measuring beam is input via a beam splitter in the form of a semi-reflecting (partially transparent) mirror or optical cut-off filter. Expediently, this beam splitter is arranged in a housing that has at least one connection for the microscope, one connection for a camera, and one connection for inputting the measuring beam.

Through the semi-reflecting mirror, the measuring beam is aimed on the axis of the beam path of the microscope. On the other hand, the semi-reflecting mirror allows light from the measurement object through to a video camera, so that the object can be observed. If the mirror also allows a part of the measuring beam reflected from the object to reach the video camera, then the measuring point will also be reproduced in the video image. Of course, this arrangement can also be constructed in the opposite manner, so that the measuring beam passes the mirror, while the normal light from the measurement object is reflected by the semi-reflecting mirror to the camera.

In an advantageous way, the semi-reflecting mirror is characterized by a frequency selective reflectivity. It thus has a high transmission for visible light (450 nm–550 nm), but a small one relative to the measuring beam (633 nm). Advantageous values are 80% transmission for the visible light and 0.2% for the measuring beam.

Since the camera can no longer be positioned, through the intermediately connected beam splitter, in the focal plane of the microscope provided for it, additional lenses are provided here in order to reproduce the microscope image in the camera.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
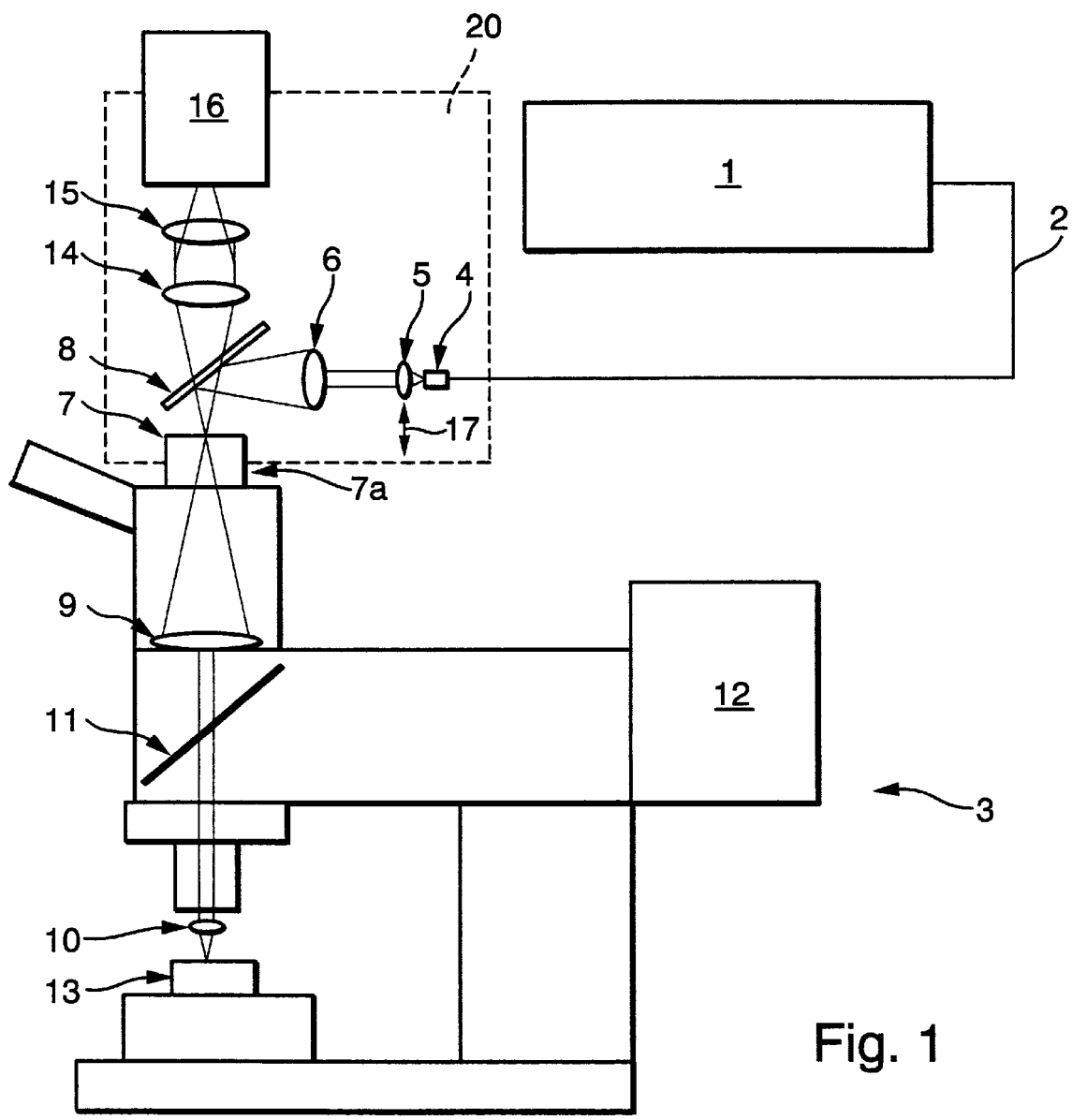
FIG. 1 is a schematic representation of the beam path and the optical components of a microscope having an apparatus installed for optical measurement.

In FIG. 1 one recognizes on the microscope stage of a microscope 3, a measurement object 13. The object 13 is illuminated by a lamp unit 12, built into the microscope, via a microscope beam splitter 11 through the lens 10 of the microscope 3. The light reflected by the object 13 is projected by the lens 10, and optionally by a microscope collimator lens 9, into the eyepiece of the microscope or onto the focal plane (first image plane) 7 of a camera connection 7a of the microscope. In this process, it passes the microscope beam splitter 11 of the illumination device. The camera connection 7a is located on the upper side of the microscope 3, approximately vertically above the object 13.

At the upper right in FIG. 1, a laser interferometer 1 is depicted schematically and is normally placed next to the microscope. This preferably involves a so-called heterodyne interferometer having an optical frequency shift of the measuring beam compared to the reference beam, whereby a recording of the object speed, having the proper sign, is possible. Such an interferometer is, for example, known from German published patent application DE 44 24 900 A1, which is incorporated herein by reference.

From the laser interferometer 1 a light beam is conducted to the microscope using a lightguide 2 in the form of a fiber optic connection. The light exiting the output end 4 of the fiber is concentrated in parallel using a collimator lens 5. A focusing lens 6 focuses the collimated beam onto the focal plane 7 of the microscope.

It is now essential that the device have a mechanism for the approximately parallel shifting of the light beam. In the embodiment shown, this shifting mechanism contains the collimator lens 5, the focusing lens 6, as well as the shifting mechanism 17 shown in FIGS. 2 and 3.

Figure 2:
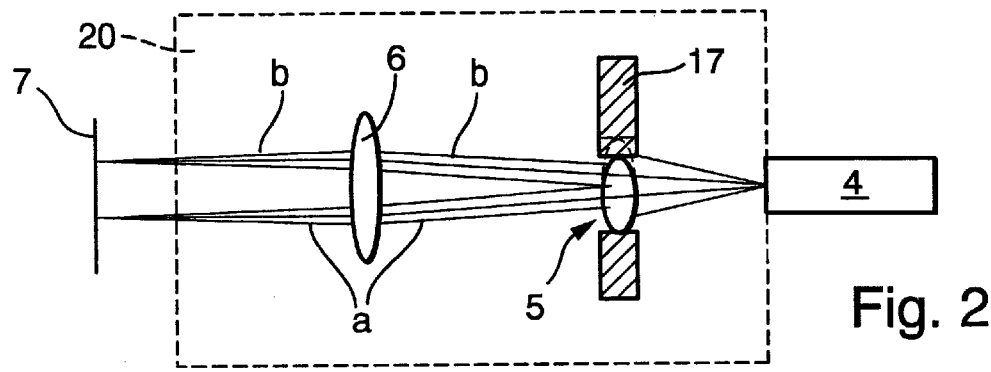
FIG. 2 is a schematic representation of a shifting device of an apparatus according to FIG. 1.

The principle of the parallel shifting can be gathered especially well from FIG. 2. There, the collimator lens 5 is able to be shifted approximately perpendicularly to the optical axis and is depicted in an upper and lower position. The respective light coming out of the fiber end 4 is bundled to a parallel beam cluster a or b and runs at an angle relative to the optical axis toward the focusing lens 6. This angle relative to the optical axis depends on the position of the collimator lens 5. It can be adjusted by lateral displacement of the collimator lens 5 using the shifting mechanism 17. Thus, in FIG. 2, instead of the beam cluster a, after shifting the collimator lens 5 the beam cluster b is conducted on to the focusing lens 6.

Through the focusing lens 6, the respectively impacting parallel beam cluster, thus a or b for example, is focused and reproduced on the focal plane 7 of the microscope. This focal plane is depicted rotated by 90° in FIG. 2 compared to FIG. 1, in order to avoid a crossing over of the two reproduced beam clusters a and b, which would make the overview difficult to see.

By a shift of the collimator lens 5 perpendicular to the optical axis, an angular displacement of the parallel beam cluster thus results behind this lens, which is transformed by the focusing lens 6 into a parallel shift. The beam clusters a and b run behind the lens 6 parallel to each other, but displaced from each other.

In regard to the angular displacement occurring in front of the focusing lens 6, the fiber end 4 is the transition point. Therefore, it is to be arranged exactly at a distance from the focusing lens 6 that is the focal length of the focusing lens 6. On the other hand, the focusing lens 6 must also be set at a distance of its focal length from the focal plane 7 of the microscope to focus the beam.

Figure 3:
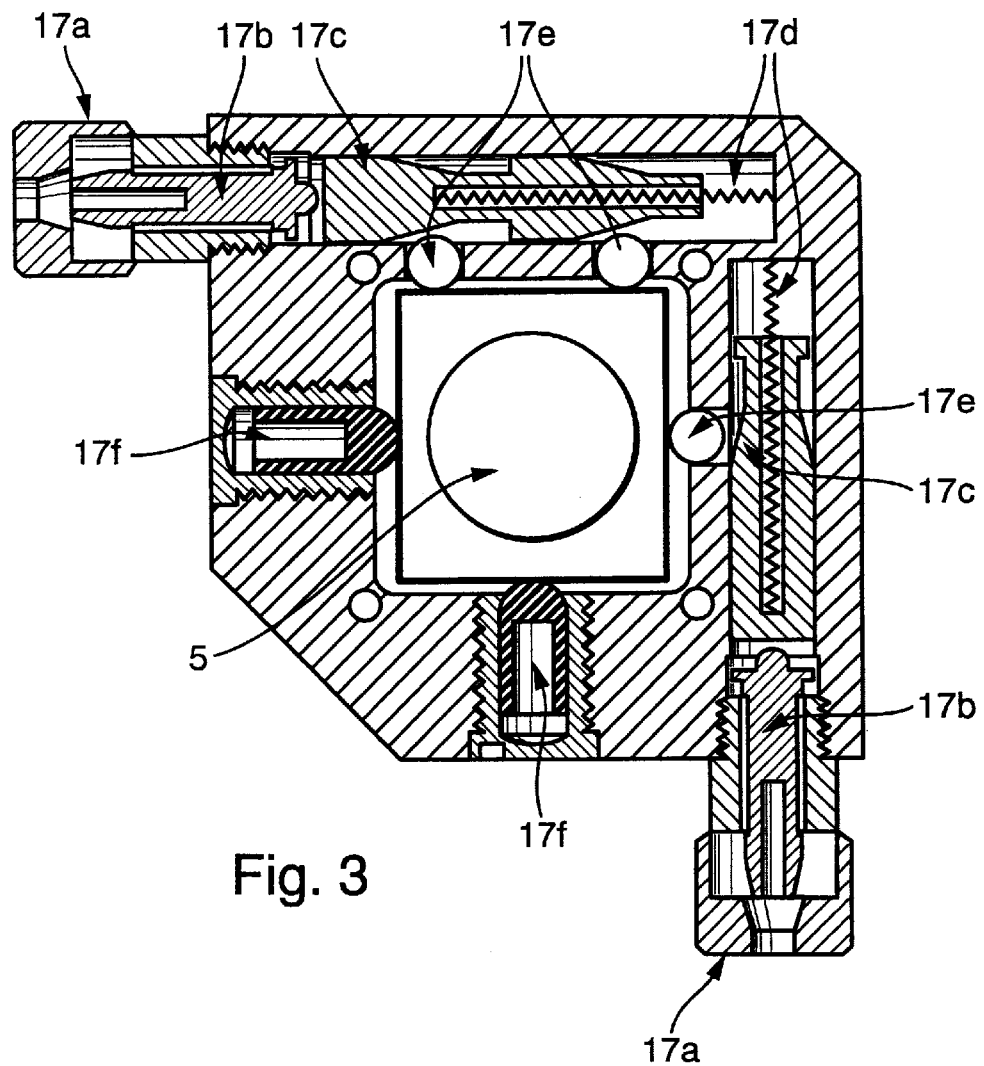
FIG. 3 shows an embodiment of a shifting mechanism of the shifting device according to FIG. 2.

The shifting mechanism 17, with which the collimator lens is shifted, is shown in FIG. 3. By activation of one of its two main adjusters 17a, one moves a respective tapered shaft 17*c* by means of an inner displacement component 17*b* against a tapered shaft return spring 17*d*. The tapered shaft 17*c* presses on one or more straight pins 17*e,* which transfer the movement of the tapered shaft 17*c* in a direction orthogonal to it and transfer it to an approximately rectangular holding block for the lens 5. This holding block is supported on the respective sides lying opposite to the straight pins 17*e* by holding block return springs 17*f*. These are compressed during inward rotation of the main adjusters 17*a* by the mechanism described, so that a lateral displacement of the lens 5 in the direction away from the main adjuster results. Conversely, during outward rotation of one of the main adjusters 17*a,* the lens 5 is moved laterally toward the main adjuster 17*a* by the respective holding block return spring 17*f*. By the orthogonal arrangement of the two main adjusters, the lens 5 can be moved in a plane in any desired manner.

At this point, it should be noted that besides the depicted purely mechanical adjustment via micrometer screws, an electro-mechanical adjustment using piezo elements is also conceivable. It can in principle be constructed in a similar manner, wherein piezo-elements are set at the positions of the straight pins 17*e*. These then press, depending on the applied electrical voltage, more or less strongly against the holding block and thus generate a corresponding mechanical displacement of the collimator lens 5. The control voltages of piezo elements can be advantageously generated via an electronic control system, which can be connected to a logic processor, in order to make possible a computer-supported displacement of the collimator lens 5 and thus of the measurement beam. Thus, the measurement object 13 can be quickly and simply measured, for example, at many points arranged next to each other on a grid.

In order to explain the measurement operation, reference should again be made to FIG. 1. The measurement beam is projected from the fiber end 4 via the collimator 5 and focusing lens 6 onto the focal plane 7 of the microscope in the manner described, or guided perpendicular to this focal plane in parallel. In this process, the beam is deflected by a beam splitter 8, which makes possible the simultaneous use of an observation camera 16, described further below. As for most microscopes, the measurement beam is projected in the embodiment from the focal plane 7 of the microscope onto the measurement object via the lens system of the microscope, i.e. microscope collimator lens 9, microscope beam splitter 11, and lens 10. A parallel shift of the measuring beam in the focal plane 7 thus likewise generates a parallel shift of the measurement point reproduced on the measurement object 13. However, this shift and likewise the size of the measuring point are reduced correspondingly through the microscope lens system.

From the measurement object 13, the measuring beam is reflected back and reproduced again in the interferometer by the optical arrangement described. A shift of the lens 5 thus always simultaneously shifts emitter and receiver.

If the measurement object 13 now moves in the direction of the measuring beam, for example by vibration events, or if it is variably high at different measuring points, then this is expressed in a change of the optical path length of the measuring arm (path length of the measuring beam to the measurement object and back) of the interferometer. The interference of the measuring and reference beams changes correspondingly in the interferometer 1, and the exhibited change of the measurement object 13 can be detected and measured exactly in the interferometer 1 in a known way.

To perform the scanning of several measuring points, without moving the measurement object 13, it is important to focus the measuring beam in a focal plane of the microscope 3 and to move it in parallel. Such a focal plane is found standardized at the camera connection of numerous microscopes. On this so-called C-mount, a video camera is usually connected, whose CCD-chip comes to rest in the focal plane 7, so that the measurement object 13 is directly reproduced on the chip. In this way, the measurement object 13 can be observed via a video camera instead of through the eyepiece of the microscope 3, whereby the observation process can optionally be recorded. The invention makes use of this standardized camera connection 7*a* in that the device for optically measuring the measurement object 13 is constructed such that (and this is significant) the measuring beam is input into the beam path of the microscope 3 at the camera connection 7*a* of the microscope 3. Thus, the equivalent or even the same structural parts and optical arrangements can be used on different microscopes.

In order to measure the measurement object 13 using the interferometer 1 with simultaneous observation through the video camera 16, approximately at the exact positioning of the measuring beam, the arrangement depicted in FIG. 1 is usable. It has for this purpose a beam splitter 8 with selective frequency reflectivity. This has a very high reflexivity in the customarily very narrow frequency range of the laser interferometer, so that the measuring beam exiting the fiber end 4 is almost completely reflected into the beam path of the microscope 3. After reflection on the measurement object 13, the measuring beam is in turn reflected back, for the most part, by the beam splitter 8 into the interferometer 1, wherein, however, approximately 0.2% of the measuring beam is transmitted through the beam splitter 8. This 0.2% of the measuring beam is visible in the image of the video camera 16, so that one can recognize which location of the measurement object 13 was just measured. Along with the high reflectivity in the area of the wavelength of the measuring beam, which is customarily 633 nm generated by a helium-neon-laser, the beam splitter 8 has a very small reflectivity in the area of visible light from approximately 450 nm to 550 nm. Correspondingly, approximately 80% of the visible light is transmitted and thus results in a strongly lighted image in the video camera 16.

Since the CCD-chip of the video camera 16 is no longer located in the focal plane 7 of the microscope 3 in the described arrangement according to the invention, the light transmitted by the beam splitter 8 is to be projected by additional lenses 14 and 15 into the video camera 16. This applies both for the visible light generated by the lamp unit 12 as well as for the transmitted part of the measuring beam of the laser interferometer 1. The collimator lens 5, the focusing lens 6, the beam splitter 8, and the additional lenses 14 and 15 are expediently arranged in a housing 20, depicted in a dash-dotted manner, which has at its lower end a connection corresponding to the standard, which can simply be connected to the C-mount 7*a* of commercially available microscopes. The housing 20 has further connections for the lightguide 2 of the interferometer 1, or its end 4, and for a commercially standard video camera 16.

On the whole, the invention is characterized by the advantages that an exact positioning of the measuring point on the measurement object 13 can occur, without having to move the measurement object 13, that moreover, the measurement object can be measured by scanning, and that the necessary structural components for measurement on any commercially standard microscope with a camera connection can be excluded, without having to be modified or optically equipped in a new way.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A device for optically measuring an object (13), comprising a laser interferometer (1) having a measuring beam that is input into the beam path of a microscope (3), a mechanism (5, 6 and 17) for shifting the measuring beam in an approximately parallel manner, and a camera connection (7a) for inputting the measurement beam into the microscope (3), wherein the shifting mechanism (5, 6 and 17) causes a shift of an impact point of the measuring beam on the measurement object (13), and wherein the measuring beam to be reflected back or scattered from the measurement object is decoupled by the camera connection (7a) from the beam path of the microscope to take measurements in a direction of the measuring beam.

2. The device according to claim 1, further comprising a beam splitter for splitting the laser beam into a measuring beam and a reference beam, whereby the measurement is performed by the interference of both beams.

3. The device according to claim 1, wherein the shifting mechanism (5, 6 and 17) allows a point-wise and/or line-wise optical scanning of the measurement object (13).

4. The device according to claim 1, wherein the shifting mechanism (5, 6 and 17) has a lens (5) which is laterally movable approximately perpendicular to the beam path, and at least two mirrors which correspond to each other, are pivotable, and spaced apart.

5. The device according to claim 1, wherein the shifting mechanism (5, 6 and 17) has positioning members selected from micrometer screws (17a) and piezo elements.

6. The device according to claim 1, wherein the shifting mechanism (5, 6 and 17) has a focusing lens (6) which focuses the measuring beam on a focal plane (7) of the microscope (3).

7. The device according to claim 6, further comprising a light guide (2) for supplying the measuring beam to the shifting device (5, 6 and 17).

8. The device according to claim 7, wherein the focusing lens (6) is spaced from an end (4) of the light guide (2) at a distance which corresponds to its focal length.

9. The device according to claim 1, further comprising a semi-reflecting beam splitter (8) for inputting the measuring beam, the beam splitter (8) having a frequency-selective reflectivity.

10. The device according to claim 9, wherein the beam splitter (8) is arranged in a housing (20) having at least one connection for the microscope (3), one connection for a camera (16), and one connection for inputting the measuring beam.

11. The device according to claim 1, wherein the shifting mechanism (17) has two lenses (5, 6), is installed in a housing (20), and has at least one connection for the microscope (3), one connection for the measuring beam of the interferometer (1), and one connection for a camera (16).

12. The device according to claim 11, wherein the housing (20) has a beam splitter (8) for inputting the measuring beam, and at least one additional lens (14, 15) for the camera connection.

* * * * *